United States Patent
Li et al.

(10) Patent No.: US 11,713,911 B2
(45) Date of Patent: Aug. 1, 2023

(54) LIQUID RESERVOIR, METHOD FOR MANUFACTURING SAME, AND COMPRESSOR HAVING SAME

(71) Applicant: GUANGDONG MEIZHI COMPRESSOR CO., LTD., Guangdong (CN)

(72) Inventors: Gaimin Li, Guangdong (CN); Bin Gao, Guangdong (CN); Qiang Gao, Guangdong (CN)

(73) Assignee: GUANGDONG MEIZHI COMPRESSOR CO., LTD., Guangdong (CN)

( * ) Notice: Subject to any disclaimer, the term of this patent is extended or adjusted under 35 U.S.C. 154(b) by 0 days.

(21) Appl. No.: 17/529,589

(22) Filed: Nov. 18, 2021

(65) Prior Publication Data

US 2022/0074634 A1 Mar. 10, 2022

Related U.S. Application Data

(63) Continuation of application No. PCT/CN2020/135016, filed on Dec. 9, 2020.

(30) Foreign Application Priority Data

May 11, 2020 (CN) .......................... 202010393297.8

(51) Int. Cl.
*F25B 43/00* (2006.01)
*B01D 46/00* (2022.01)
(Continued)

(52) U.S. Cl.
CPC ........ *F25B 43/003* (2013.01); *B01D 46/0005* (2013.01); *B23P 11/00* (2013.01);
(Continued)

(58) Field of Classification Search
CPC .. F25B 43/003; F25B 31/02; F25B 2400/162; F25B 2500/28; F25B 43/006;
(Continued)

(56) References Cited

U.S. PATENT DOCUMENTS

| | | | | |
|---|---|---|---|---|
| 4,125,469 A | * | 11/1978 | Henton | ................ B01D 35/15 210/136 |
| 6,092,284 A | * | 7/2000 | Dreiman | ............. F04B 39/0061 29/890.053 |
| 2019/0293328 A1 | | 9/2019 | Ayub | |

FOREIGN PATENT DOCUMENTS

| CN | 2898730 Y | 5/2007 |
|---|---|---|
| CN | 206847139 U | 1/2018 |

(Continued)

OTHER PUBLICATIONS

International Search Report dated Mar. 1, 2021 issued in PCT/CN2020/135016.
Chinese OA dated Feb. 26, 2021 issued in 202010393297.8.

*Primary Examiner* — Frantz F Jules
*Assistant Examiner* — Webeshet Mengesha
(74) *Attorney, Agent, or Firm* — Scully, Scott, Murphy & Presser, P.C.

(57) ABSTRACT

A liquid reservoir, a method for manufacturing the liquid reservoir, and a compressor having the liquid reservoir are disclosed. The liquid reservoir has a barrel, an air inlet tube, an air outlet tube, and a valve. The valve has a partition plate arranged in the barrel. An outer periphery of the partition plate is coupled to an inner peripheral wall of the barrel to divide the internal space of the barrel into an air inlet chamber and an air outlet chamber. The partition plate has a valve hole communicating the air inlet chamber with the air outlet chamber. A limit plate is arranged in the air outlet chamber and at least partially spaced apart from the partition plate. An outer periphery of the limit plate is coupled to the (Continued)

inner peripheral wall of the barrel. The limit plate has a connection hole and a guide hole.

7 Claims, 4 Drawing Sheets

(51) Int. Cl.
 *B23P 11/00* (2006.01)
 *F25B 31/02* (2006.01)
(52) U.S. Cl.
 CPC ........ *F25B 31/02* (2013.01); *F25B 2400/162* (2013.01); *F25B 2500/28* (2013.01)
(58) Field of Classification Search
 CPC .. F25B 2500/01; B01D 46/0005; B23P 15/00; B23P 11/00
 See application file for complete search history.

(56) References Cited

FOREIGN PATENT DOCUMENTS

| | | |
|---|---|---|
| CN | 108731317 A | 11/2018 |
| CN | 208365880 U | 1/2019 |
| CN | 110895066 A | 3/2020 |
| CN | 210266036 U | 4/2020 |
| CN | 210441470 U | 5/2020 |
| CN | 111578563 A | 8/2020 |
| JP | H0730972 B2 * | 10/1988 |
| JP | H0814708 A | 1/1996 |
| JP | 2004360476 A | 12/2004 |
| JP | 2005146986 A | 6/2005 |

* cited by examiner

LIQUID RESERVOIR, METHOD FOR MANUFACTURING SAME, AND COMPRESSOR HAVING SAME

CROSS-REFERENCE TO RELATED APPLICATIONS

The present application is a continuation application of PCT International Application No. PCT/CN2020/135016, filed on Dec. 9, 2020, which claims the benefit of and priority to the Chinese Patent Application No. 202010393297.8, filed on May 11, 2020, with China National Intellectual Property Administration, the entire contents of which are incorporated herein by reference for all purposes. No new matter has been introduced.

FIELD

Embodiments of this application relate to the technical field of compressors and, more particularly, to a liquid reservoir, a method for manufacturing the liquid reservoir, and a compressor having the liquid reservoir.

BACKGROUND

Regarding the problems of fast restart of compressors and heat loss of heat exchangers, exhaust check valves and air inlet check valves are arranged inside upper housing parts and liquid reservoirs of the compressors in the related art. The liquid reservoirs in the related art have problems of high cost, low productivity, and poor durability of the check valves.

SUMMARY

Accordingly, embodiments of the present disclosure propose a liquid reservoir that has high durability and low production cost and is suitable for mass production.

Embodiments of the present disclosure further propose a method for manufacturing the liquid reservoir, and the method has high production efficiency and low cost.

Embodiments of the present disclosure further propose a compressor having the above liquid reservoir.

A liquid reservoir according to embodiments of a first aspect of the present disclosure includes: a barrel having an air inlet at an upper end of the barrel and an air outlet at a lower end of the barrel; an air inlet tube coupled to the air inlet and an air outlet tube coupled to the air outlet; and a valve arranged in the barrel. The valve includes: a partition plate arranged in the barrel, an outer periphery of the partition plate being coupled to an inner peripheral wall of the barrel to divide internal space of the barrel into an air inlet chamber in communication with the air inlet and an air outlet chamber in communication with the air outlet, and the partition plate having a valve hole communicating the air inlet chamber with the air outlet chamber; and a limit plate arranged in the air outlet chamber and at least partially spaced apart from the partition plate, an outer periphery of the limit plate being coupled to the inner peripheral wall of the barrel, and the limit plate having a connection hole and a guide hole.

In the liquid reservoir according to embodiments of the present disclosure, the outer periphery of the limit member is coupled to the inner peripheral wall of the barrel and is at least partially spaced from the partition plate, that is, the limit member is not arranged on the partition plate within the barrel, but is coupled to the inner peripheral wall of the barrel as the partition plate, which makes installation easy. Moreover, the partition plate and the barrel may be first coupled before a valve core assembly is mounted, and mechanical and fatigue performance of springs and valve plates will not be affected when the partition plate is coupled to the barrel, which improves the durability of valves in the liquid reservoir.

A method for manufacturing a liquid reservoir according to embodiments of a second aspect of the present disclosure includes: preparing a barrel with an open upper end and an open lower end; press-fitting a partition plate into the barrel and welding the partition plate to the barrel by in-furnace brazing; arranging a valve core assembly in a predetermined position within the barrel and press-fitting a limit plate into the barrel to limit the valve core assembly; narrowing the upper end of the barrel to form an air inlet and narrowing the lower end of the barrel to form an air outlet; and coupling an air inlet tube to the air inlet and coupling an air outlet tube to the air outlet.

With the method for manufacturing the liquid reservoir according to embodiments of the present disclosure, the partition plate is welded to the barrel by in-furnace brazing, which reduces the production cost and is suitable for mass production; the partition plate is brazed with the barrel before the valve core assembly is installed, which avoids influence on the mechanical and fatigue performance of the spring and the valve plate, and improves the durability of the valve in the liquid reservoir; when the valve core assembly is installed, the limit plate is pressed into the barrel to limit the valve core assembly, and the limit plate does not need to be coupled to the partition plate, which makes the installation convenient.

A compressor according to embodiments of a third aspect of the present disclosure includes: a housing, a motor, a compression mechanism, and the liquid reservoir according to any one of the above embodiments, the liquid reservoir being arranged outside the housing and coupled to the compression mechanism by the air outlet tube.

For the compressor according to embodiments of the present disclosure, the components of the liquid reservoir can be mounted conveniently, and the valve has high durability and low cost.

In some embodiments, the barrel has a plurality of annular protrusions formed on an inner wall of the barrel by pressing the barrel inwardly from outside, an upper surface of the partition plate is restricted by the plurality of annular protrusions, and the limit plate is positioned by the plurality of annular protrusions or by the plurality of annular protrusions and the partition plate.

In some embodiments, a bent end is arranged on an outer peripheral edge of the limit plate and fits against the inner peripheral wall of the barrel; the plurality of annular protrusions include a first annular protrusion and a second annular protrusion; the upper surface of the partition plate is restricted by the first annular protrusion, a terminal tip of the bent end abuts against the partition plate, and a lower surface of the limit plate is restricted by the second annular protrusion.

In some embodiments, a bent end is arranged on an outer peripheral edge of the limit plate and fits against the inner peripheral wall of the barrel; the plurality of annular protrusions include a first annular protrusion, a second annular protrusion, and a third annular protrusion between the first annular protrusion and the second annular protrusion; the upper surface of the partition plate is restricted by the first annular protrusion, a terminal tip of the bent end is restricted by the second annular protrusion, and an upper surface of the limit plate is restricted by the third annular protrusion.

In some embodiments, the liquid reservoir further includes: a filter screen holder arranged within the air inlet chamber and fixed between the plurality of annular protrusions; and a filter screen mounted on the filter screen holder.

In some embodiments, the limit plate has an annular recess formed by stamping the limit plate from a first side to a second side.

In some embodiments, the valve further includes a valve core assembly, and the valve core assembly includes: a guide block having a part movably arranged between the partition plate and the limit plate and having an end movably fit in the guide hole; a spring arranged between the partition plate and the guide block and configured to push the guide block toward the limit plate; and a valve plate mounted on the guide block and configured to close and open the valve hole.

In some embodiments, the method for manufacturing the liquid reservoir further includes spinning and pressing the barrel inwardly from outside to position the partition plate and the limit plate.

Figure 1:
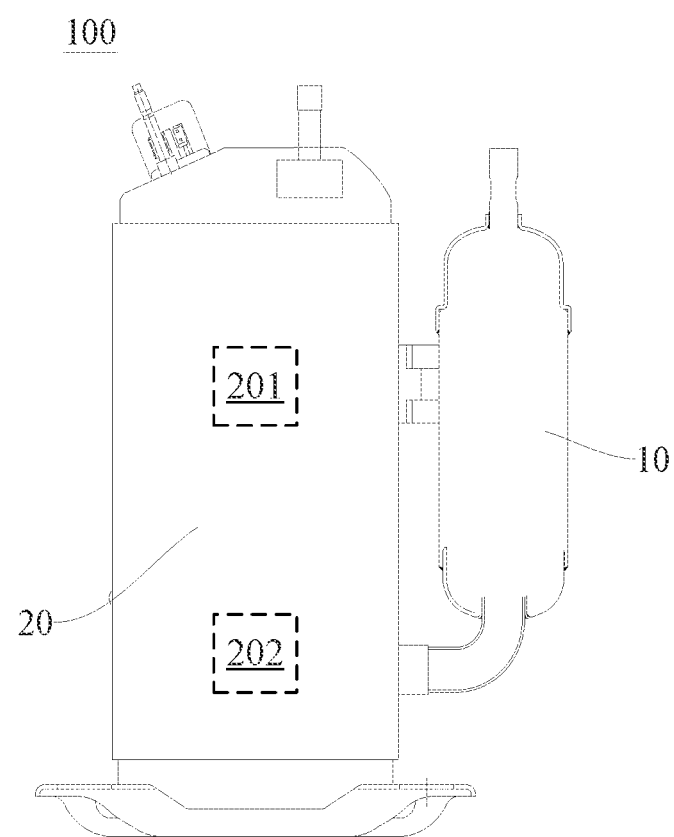
FIG. 1 is a schematic view of a compressor according to embodiments of the present disclosure.

Reference numerals: compressor 100, liquid reservoir 10, barrel 1, air inlet 11, air outlet 12, annular protrusion 13, first annular protrusion 131, second annular protrusion 132, third annular protrusion 133, air inlet chamber 101, air outlet chamber 102, air inlet tube 2, air outlet tube 3, valve 4, partition plate 41, valve hole 411, limit plate 42, connection hole 421, guide hole 422, bent end 423, terminal tip 4231, annular recess 424, valve core assembly 43, guide block 431, flange 4311, spring 432, valve plate 433, filter screen holder 5, filter screen 6, screw 7, housing 20.

DETAILED DESCRIPTION OF EMBODIMENTS

Embodiments of the present disclosure will be described in detail below, and examples of the embodiments will be illustrated in the drawings. The embodiments described with reference to the drawings are exemplary and are intended to explain the present disclosure rather than limit the present disclosure. In the description, it is to be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation as then described or as shown in the drawings under discussion. These terms are for convenience of description and do not indicate or imply that the device or element referred to must have a particular orientation or be constructed and operated in a particular orientation. Thus, these terms shall not be construed as limitation on the present disclosure.

As shown in FIG. 1, a compressor 100 according to embodiments of the present disclosure includes a housing 20, a motor 201, a compression mechanism 202, and a liquid reservoir. The compression mechanism 202 is disposed inside the housing 20, the liquid reservoir is disposed outside the housing 20 and coupled to the compression mechanism, and the liquid reservoir is a liquid reservoir 10 according to embodiments of the present disclosure.

The liquid reservoir according to embodiments of the present disclosure will be described below with reference to FIGS. 2-9.

Figure 2:
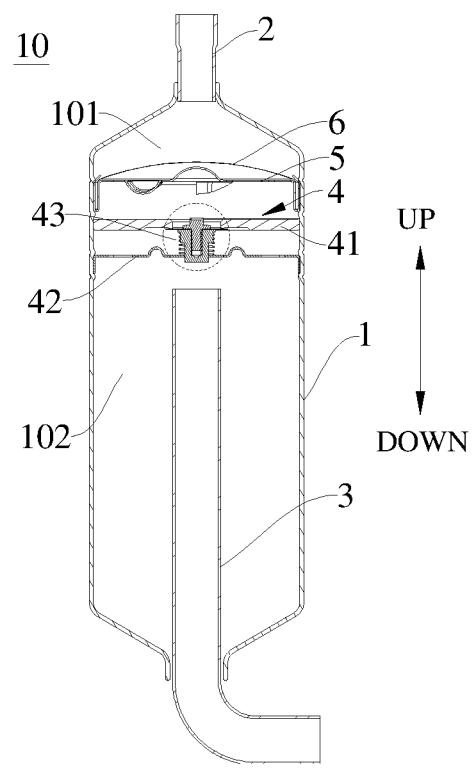
FIG. 2 is a sectional view of a liquid reservoir according to an embodiment of the present disclosure.
Figure 3:
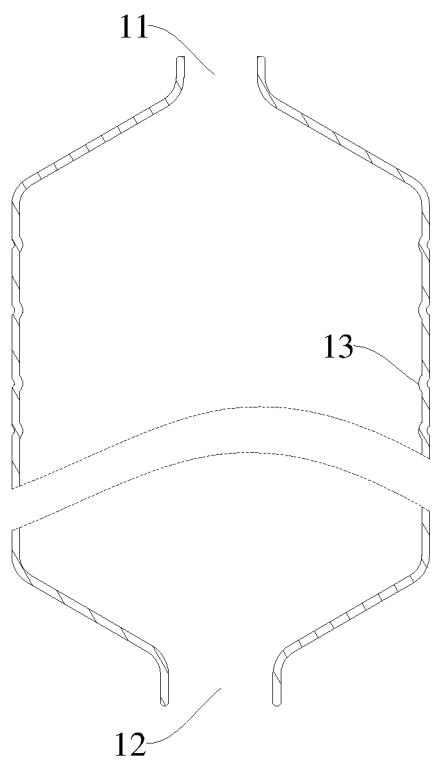
FIG. 3 is a schematic view of a barrel of the liquid reservoir in FIG. 2.

As shown in FIGS. 2-9, the liquid reservoir 10 according to the embodiments of the present disclosure includes a barrel 1, an air inlet tube 2, an air outlet tube 3 and a valve 4. As shown in FIG. 3, an air inlet 11 is arranged at an upper end of the barrel 1 and an air outlet 12 is arranged at a lower end of the barrel 1. The air inlet tube 2 is coupled to the air inlet 11 and the air outlet tube 3 is coupled to the air outlet 12. As shown in FIGS. 2 and 3, a lower end of the air inlet tube 2 enters internal space of the barrel 1 through the air inlet 11, and the air inlet tube 2 is coupled to the upper end of the barrel 1. An upper end of the air outlet tube 3 enters the internal space of the barrel 1 through the air outlet 12, and the air outlet tube 3 is coupled to the lower end of the barrel 1. An outer end of the air outlet tube 3 is coupled to the compression mechanism, and the liquid reservoir 10 is coupled to the compression mechanism through the air outlet tube 3.

Figure 5:
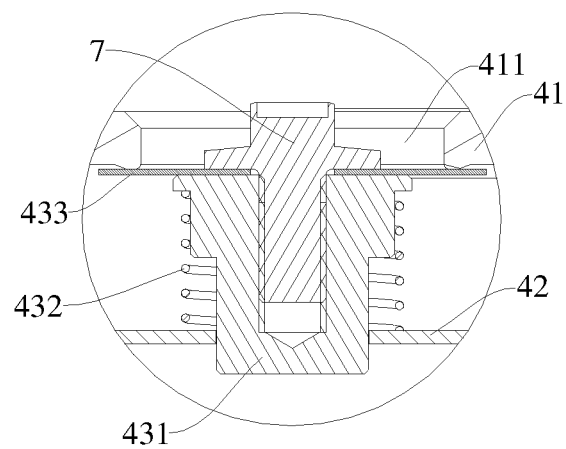
FIG. 5 is a partially enlarged view of part A in FIG. 2.

The valve 4 is arranged in the barrel 1 and includes a partition plate 41 and a limit plate 42. The partition plate 41 is arranged in the barrel 1, and an outer periphery of the partition plate 41 is coupled to or engaged with an inner peripheral wall of the barrel 1 to divide the internal space of the barrel 1 into an air inlet chamber 101 and an air outlet chamber 102, the air inlet chamber 101 being in communication with the air inlet 11, and the air outlet chamber 102 being in communication with the air outlet 12. As shown in FIG. 2, the air inlet chamber 101 and the air outlet chamber 102 are spaced apart by the partition plate 41 and arranged in sequence from top down, a top of the air inlet chamber 101 is in communication with the air inlet 11, and the lower end of the air inlet tube 2 extends into the air inlet chamber 101. A bottom of the air outlet chamber 102 is in communication with the air outlet 12, and the upper end of the air outlet tube 3 extends into the air outlet chamber 102. The partition plate 41 has a valve hole 411 communicating the air inlet chamber 101 with the air outlet chamber 102. As shown in FIGS. 2 and 5, the partition plate 4 has the valve hole 411 running through the partition plate 41 in an up-down direction to communicate the air inlet chamber 101 with the air outlet chamber 102.

The limit plate 42 is disposed in the air outlet chamber 102 and is at least partially spaced apart from the partition plate 41; an outer periphery of the limit plate 42 is coupled to the inner peripheral wall of the barrel 1; and the limit plate 42 has a connection hole 421 and a guide hole 422. As shown in FIGS. 2, 4, 7 and 8, the limit plate 42 is disposed below the partition plate 41, and at least a part of the limit plate 42 is spaced apart from the partition plate 41 in the up-down direction. The limit plate 42 is provided with the connection hole 421 and the guide hole 422 spaced apart from each other, and the connection hole 421 and the guide hole 422 both extend through the limit plate 42 in the up-down direction. The connection hole 421 communicates the space of the air outlet chamber 102 and between the limit plate 42 and the partition plate 41 with the space of the air outlet chamber 102 and below the limit plate 42. There are a plurality of connection holes 421, and the plurality of connection holes 421 are spaced apart from the guide hole 422.

In the liquid reservoir according to embodiments of the present disclosure, the outer periphery of the limit member is coupled to the inner peripheral wall of the barrel and is at least partially spaced from the partition plate, that is, the limit member is not arranged on the partition plate within the barrel, but is coupled to the inner peripheral wall of the barrel as the partition plate, which makes installation easy. Moreover, the partition plate and the barrel may be first coupled before a valve core assembly 43 is mounted, and mechanical and fatigue performance of springs and valve plates will not be affected when the partition plate is coupled to the barrel, which improves the durability of valves in the liquid reservoir.

Figure 4:
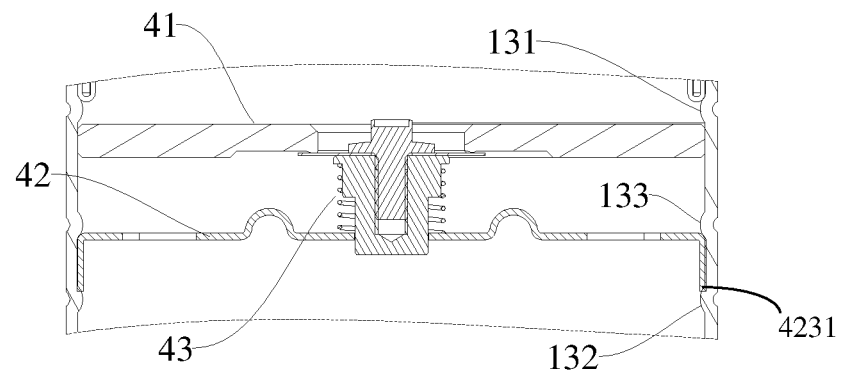
FIG. 4 is a schematic view of a valve of the liquid reservoir in FIG. 2.
Figure 7:
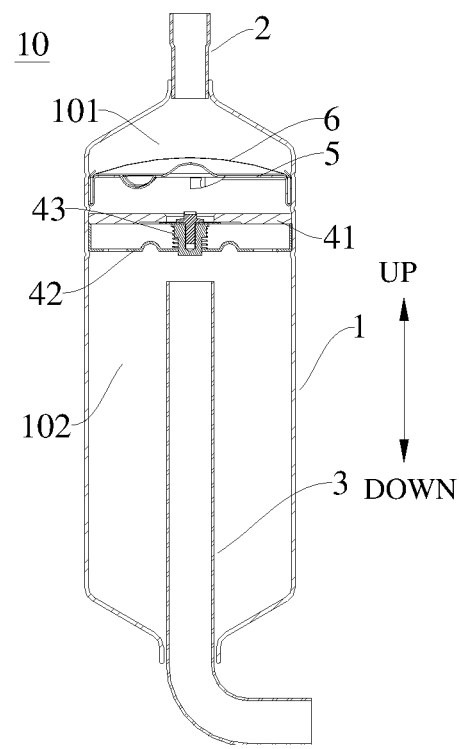
FIG. 7 is a sectional view of a liquid reservoir according to another embodiment of the present disclosure.
Figure 8:
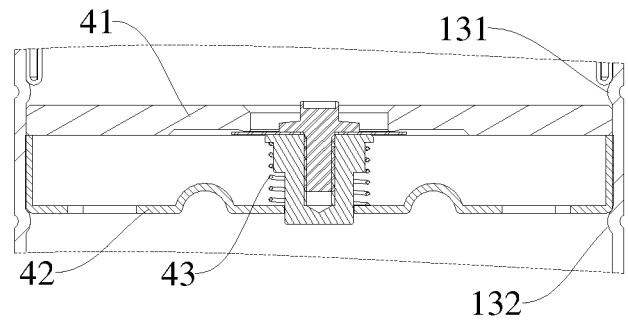
FIG. 8 is a schematic view of a valve of the liquid reservoir in FIG. 7.

In some embodiments, a plurality of annular protrusions 13 are formed on an inner wall of the barrel 1 by pressing the barrel 1 inwardly from the outside, an upper surface of the partition plate 41 is restricted by the annular protrusions 13, and the limit plate 42 is positioned by the annular protrusions 13 or by the annular protrusions 13 and the partition plate 41. As shown in FIGS. 2-4 and 7-8, the inner wall of the barrel 1 has a plurality of annular protrusions 13 arranged at intervals in the up-down direction, the annular protrusions 13 are formed by pressing the barrel 1 inwardly from the outside of the barrel 1. The upper surface of the partition plate 41 is restricted by a lower part of the annular protrusions 13. The limit plate 42 is positioned by the annular protrusions 13, as shown in FIGS. 2-4; alternatively, the limit plate 42 is positioned by the annular protrusions 13 and the partition plate 41, as shown in FIGS. 7 and 8.

Figure 6:
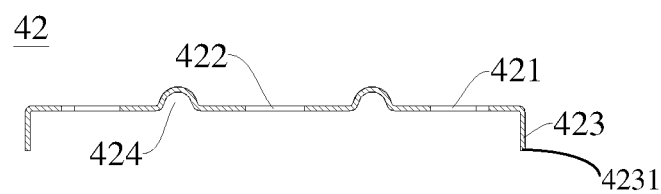
FIG. 6 is a schematic view of a limit plate of the liquid reservoir in FIG. 2.
Figure 9:
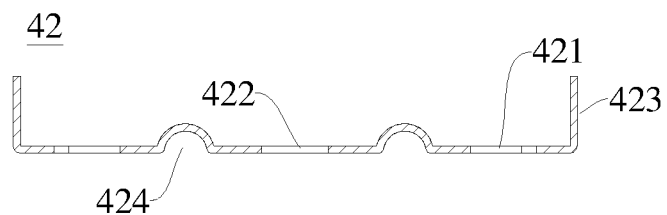
FIG. 9 is a schematic view of a limit plate of the liquid reservoir in FIG. 7.

In some embodiments, an outer peripheral edge of the limit plate 42 is provided with a bent end 423 that fits against the inner peripheral wall of the barrel 1. As shown in FIGS. 2, 4 and 6 and FIGS. 7-9, the bent end 423 is arranged on the outer peripheral edge of the limit plate 42 and coupled to the inner peripheral wall of the barrel 1. For example, as shown in FIGS. 2, 4, and 6, the bent end 423 extends downward; alternatively, as shown in FIGS. 7-9, for example, the bent end 423 extends upward.

In some optional embodiments, the plurality of annular protrusions 13 includes a first annular protrusion 131, a second annular protrusion 132, and a third annular protrusion 133 between the first annular protrusion 131 and the second annular protrusion 132. The upper surface of the partition plate 41 is restricted by the first annular protrusion 131, a terminal tip 4231 of the bent end 423 is restricted by the second annular protrusion 132, and an upper surface of the limit plate 42 is restricted by the third annular protrusion 133. As shown in FIGS. 2 and 4, the first annular protrusion 131, the third annular protrusion 133, and the second annular protrusion 132 are arranged sequentially from top down and spaced apart from one another, and the upper surface of the partition plate 41 abuts against a lower part of the first annular protrusion 131, the bent end 423 extends downward with its lower end abutting against an upper part of the second annular protrusion 132, and the upper surface of the limit plate 42 abuts against a lower part of the third annular protrusion 133.

In some other optional embodiments, the plurality of annular protrusions 13 includes a first annular protrusion 131 and a second annular protrusion 132; the upper surface of the partition plate 41 is restricted by the first annular protrusion 131; a terminal tip 4231 of the bent end 423 abuts against the partition plate 41; and a lower surface of the limit plate 42 is restricted by the second annular protrusion 132. As shown in FIGS. 7 and 8, the first annular protrusion 131 and the second annular protrusion 132 are arranged sequentially from top down and spaced apart from each other; the upper surface of the partition plate 41 abuts against a lower part of the first annular protrusion 131; the bent end 423 extends upward with its upper end abutting against a lower surface of the partition plate 41; and the lower surface of the limit plate 42 abuts against an upper part of the second annular protrusion 132.

In some embodiments, the liquid reservoir 10 further includes a filter screen holder 5 and a filter screen 6 mounted on the filter screen holder 5, the filter screen holder 5 being disposed within the air inlet chamber 101 and the filter screen holder 5 being fixed between the annular protrusions 13. As shown in FIGS. 2 and 7, the filter screen holder 5 is arranged in the air inlet chamber 101 and positioned by the annular protrusions 13. The filter screen holder 5 is positioned by two annular protrusions 13 that are adjacent in the up-down direction. By mounting the filter screen 6 on the filter screen holder 5, the filter screen 6 is located on an air inlet side of the liquid reservoir 10, which makes the installation easy and facilitates filtration of impurities before gas passes through valves.

In some embodiments, the limit plate 42 has a closed, continuous annular recess 424 formed by stamping the limit plate 42 from one side to another side. As shown in FIGS. 6 and 9, the limit plate 42 is provided with the closed, continuous annular recess 424 formed by stamping the limit plate 42 from a lower side to an upper side of the limit plate 42 in an up-down direction, wherein the annular recess 424 surrounds the guide hole 422 and is not immediately adjacent to the guide hole 422. By providing the annular recess 424 on the limit plate 42, stress on the limit plate 42 can be released to relieve fatigue of the limit plate 42, improve reliability, and prolong its service life.

In some embodiments, the partition plate 41 is welded to the inner peripheral wall of the barrel 1 by in-furnace brazing. By coupling the partition plate 41 to the barrel 1 by in-furnace brazing, production costs can be reduced, mass production can be achieved, and production efficiency can be improved.

In some embodiments, a guide block 431 has a threaded hole on its upper surface, and a valve plate 433 is fixed on the upper surface of the guide block 431 by a screw 7 that fits inside the threaded hole. As shown in FIGS. 2 and 4, the upper surface of the guide block 431 is provided with the threaded hole extending downwards; the valve plate 433 is provided with a through hole running through the valve plate 433 in the up-down direction; and the screw 7 extends from the valve hole 411 into the through hole and the threaded hole in sequence to achieve fixed connection between the valve plate 433 and the guide block 431 by the screw 7.

In some embodiments, the valve 4 further includes a valve core assembly 43, and the valve core assembly 43 includes a guide block 431, a spring 432, and a valve plate 433; a part of the guide block 431 is movably disposed between the partition plate 41 and the limit plate 42; and an end of the guide block 431 is movably fit in the guide hole 422. As shown in FIGS. 2-4, the guide block 431 is movably disposed below the partition plate 41, a lower end of the guide block 431 fits in the guide hole 422 and is movable relative to the limit plate 42, and the remainder of the guide block 431 is disposed between the limit plate 42 and the partition plate 41.

The spring 432 is arranged between the partition plate 41 and the guide block 431 and used to push the guide block 431 toward the limit plate 42. As shown in FIGS. 2-4, a flange 4311 is arranged at an upper end of the guide block 431; the spring 432 surrounds the guide block 431 and is located below the flange 4311; an upper end of the spring 432 abuts against a lower surface of the flange 4311; and a lower end of the spring 432 abuts against the upper surface of the limit plate 42. The spring 432 exerts a resilient force to push up and press the guide block 431.

The valve plate 433 is mounted on the guide block 431 to close and open the valve hole 411. As shown in FIGS. 2-4, the valve plate 433 is mounted on the upper end of the guide block 431. In a projection plane perpendicular to the up-down direction, a peripheral contour of the valve hole 411 is located within a peripheral contour of the valve plate 433 so that when the guide block 431 drives the valve plate 433 to move upward, at least a part of the valve plate 433 can fit against the partition plate 41 to close the valve hole 411. The spring 432 pushes up and presses the guide block 431 to move the valve plate 433 upward to close the valve hole 411.

When the compressor 100 stops operation, the spring 432 causes the guide block 431 to move the valve plate 433 upward until the valve plate comes into contact with the partition plate 41 to close the valve hole 411, and the valve 4 is closed, so that the air inlet chamber 101 and the air outlet chamber 102 of the barrel 1 are not in communication with each other, preventing gas from flowing back from the air outlet chamber 102 to the air inlet chamber 101.

The liquid reservoir according to a specific example of the present disclosure will be described below with reference to FIG. 2-FIG. 6.

As shown in FIGS. 2-6, the liquid reservoir 10 includes a barrel 1, an air inlet tube 2, an air outlet tube 3, a valve 4, a filter screen holder 5, a filter screen 6, and a screw 7.

The barrel 1 has an air inlet 11 at an upper end of the barrel. A lower end of the air inlet tube 2 extends into internal space of the barrel 1 through the air inlet 11, and the air inlet tube 2 is coupled to an upper end of the barrel 1. The barrel 1 has an air outlet 12 at a lower end of the barrel. An upper end of the air outlet tube 3 extends into the internal space of the barrel 1 through the air outlet 12, and the air outlet tube 3 is coupled to a lower end of the barrel 1. The barrel 1 has a plurality of annular protrusions 13 arranged on an inner wall of the barrel and at intervals in the up-down direction, and the annular protrusions 13 are formed by pressing the barrel inwardly from the outside of the barrel 1. The plurality of annular protrusions 13 includes a first annular protrusion 131, a third annular protrusion 133, and a second annular protrusion 132 sequentially arranged at intervals from top down.

The valve 4 is arranged in the barrel 1 and includes a partition plate 41, a limit plate 42, and a valve core assembly 43. The partition plate 41 is arranged in the barrel 1, an upper surface of the partition plate 41 abuts against a lower part of the first annular protrusion 131, and an outer periphery of the partition plate 41 is coupled to an inner peripheral wall of the barrel 1 to divide the internal space of the barrel 1 into an air inlet chamber 101 and an air outlet chamber 102 arranged sequentially from top down. A top of the air inlet chamber 101 is in communication with the air inlet 11 and a bottom of the air outlet chamber 102 is in communication with the air outlet 12. The partition plate 4 has a valve hole 411 running through the partition plate 41 in the up-down direction to connect the air inlet chamber 101 and the air outlet chamber 102. The lower end of the air inlet tube 2 extends into the air inlet chamber 101 and the upper end of the air outlet tube 3 extends into the air outlet chamber 102. For example, the partition plate 41 is welded to the inner peripheral wall of the barrel 1 by in-furnace brazing. By connecting the partition plate 41 to the barrel 1 by in-furnace brazing, production costs can be reduced, mass production can be realized, and production efficiency can be improved.

The limit plate 42 is arranged below the partition plate 41 and spaced apart from the partition plate 41 in the up-down direction. An outer peripheral edge of the limit plate 42 is provided with a bent end 423 extending downwards and coupled to the inner peripheral wall of the barrel 1. A lower tip of the bent end 423 abuts against an upper part of the second annular protrusion 132, and an upper surface of the limit plate 42 abuts against a lower part of the third annular protrusion 133.

The limit plate 42 has a connection hole 421 and a guide hole 422 spaced apart from each other, and the connection hole 421 and the guide hole 422 both extend through the limit plate 42 in the up-down direction. There are a plurality of connection holes 421 arranged at intervals, and the plurality of connection holes 421 communicate the space of the air outlet chamber 102 located between the limit plate 42 and the partition plate 41 with the space of the air outlet chamber 102 located below the limit plate 42.

The limit plate 42 has a closed, continuous annular recess 424 formed by stamping the limit plate from a lower side to an upper side of the limit plate 42 in the up-down direction to relieve stress on the limit plate, improve reliability, and prolong its service life.

The valve core assembly 43 includes a guide block 431, a spring 432, and a valve plate 433. The guide block 431 is movably disposed below the partition plate 41; a lower end of the guide block 431 fits in the guide hole 422 and is movable relative to the limit plate 42; and the remainder of the guide block 431 is disposed between the limit plate 42 and the partition plate 41. A flange 4311 is arranged at an upper end of the guide block 431, and the guide block 431 has a threaded hole extending downwardly from an upper surface of the flange 4311.

The valve plate 433 is mounted on the upper end of the guide block 431, and a peripheral contour of the valve hole 411 is located within a peripheral contour of the valve plate 433 in a projection plane perpendicular to the up-down direction, so that when the guide block 431 drives the valve plate 433 to move upward, at least a part of the valve plate 433 can fit against the partition plate 41 to close the valve hole 411.

The valve plate 433 has a through hole running through the valve plate 433 in the up-down direction; and the screw 7 extends from the valve hole 411 into the through hole and the threaded hole in sequence to achieve fixed connection between the valve plate 433 and the guide block 431 by the screw 7.

The spring 432 surrounds the guide block 431 and is located below the flange 4311; an upper end of the spring 432 abuts against a lower surface of the flange 4311; and a lower end of the spring 432 abuts against the upper surface of the limit plate 42. The spring 432 exerts a resilient force to push up and press the guide block 431, to move the valve plate 433 upward to close the valve hole 411.

The filter screen holder 5 is arranged in the air inlet chamber 101 and positioned by the annular protrusions 13. The filter screen 6 is mounted on the filter screen holder 5 and located on an air inlet side of the liquid reservoir, which makes the installation easy and facilitates filtration of impurities before gas passes through valves.

The liquid reservoir according to another specific example of the present disclosure will be described below with reference to FIGS. 7-9.

As shown in FIGS. 7-9, the liquid reservoir 10 includes a barrel 1, an air inlet tube 2, an air outlet tube 3, a valve 4, a filter screen holder 5, a filter screen 6, and a screw 7.

A plurality of annular protrusions 13 on an inner wall of the barrel 1 include a first annular protrusion 131 and a second annular protrusion 132 arranged sequentially from top down and spaced apart from each other.

An outer peripheral edge of the limit plate 42 is provided with a bent end 423 extending upwards; an upper surface of the partition plate 41 abuts against a lower part of the first annular protrusion 131; an upper tip of the bent end 423 abuts against a lower surface of the partition plate 41; and a lower surface of the limit plate 42 abuts against an upper part of the second annular protrusion 132.

Other structures and operations of the liquid reservoir shown in FIGS. 7-9 may be the same as those of the embodiments shown in FIGS. 2-6 and will not be described in detail herein.

A method for manufacturing a liquid reservoir according to embodiments of the present disclosure will be described below.

The method includes the following steps: preparing a barrel with an open upper end and an open lower end; press-fitting a partition plate into the barrel and welding the partition plate to the barrel by in-furnace brazing; arranging a valve core assembly 43 in a predetermined position within the barrel 1 and press-fitting a limit plate into the barrel 1 to limit the valve core assembly; narrowing the upper end of the barrel to form an air inlet and narrowing the lower end of the barrel to form an air outlet; coupling an air inlet tube to the air inlet and coupling an air outlet tube to the air outlet.

With the method for manufacturing the liquid reservoir according to embodiments of the present disclosure, the partition plate is welded to the barrel by in-furnace brazing, which reduces the production cost and is suitable for mass production; the partition plate is brazed with the barrel before the valve core assembly is installed, which avoids influence on the mechanical and fatigue performance of the spring and the valve plate, and improves the durability of the valve in the liquid reservoir; when the valve core assembly is installed, the limit plate is pressed into the barrel to limit the valve core assembly, and the limit plate does not need to be coupled to the partition plate, which makes the installation convenient.

In some embodiments, the method also includes spinning and pressing the barrel inwardly from the outside to position the partition plate and the limit plate.

In the specification, reference to terms "an embodiment," "some embodiments," "an example," "a specific example," "some examples" or the like means that a particular feature, structure, material, or characteristic described in connection with the embodiment or example is included in at least one embodiment or example of the present disclosure. In this specification, the above terms are not necessarily referring to the same embodiment or example. Furthermore, the particular features, structures, materials, or characteristics described may be combined in any suitable manner in any one or more embodiments or examples. Moreover, those skilled in the art may combine or incorporate different embodiments or examples described in the specification as well as technical features in different embodiments or examples, without contradicting each other.

In the specification, the term "a plurality of" means at least two, for example, two, three or etc., unless specified or limited otherwise.

In the specification, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications or interaction of two elements, which can be understood by those skilled in the art according to specific situations.

In addition, terms such as "first" and "second" are used herein for purposes of description and are not intended to indicate or imply relative importance or significance or to imply the number of indicated technical features. Thus, the feature defined with "first" and "second" may comprise one or more of this feature.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Although embodiments of the present disclosure have been shown and described, it can be appreciated by those skilled in the art that the above embodiments are exemplary, and various changes, modifications, alternatives and variants can be made to these embodiments within the protection scope of the present disclosure.

What is claimed is:

1. A liquid reservoir comprising:
   a barrel having an air inlet at an upper end of the barrel and an air outlet at a lower end of the barrel;
   an air inlet tube coupled to the air inlet;
   an air outlet tube coupled to the air outlet; and
   a valve arranged in the barrel, the valve comprising:
   a partition plate arranged in the barrel, an outer periphery of the partition plate being coupled to an inner peripheral wall of the barrel to divide an internal space of the barrel into an air inlet chamber in communication with the air inlet and an air outlet chamber in communication with the air outlet, and the partition plate having a valve hole communicating the air inlet chamber with the air outlet chamber; and
   a limit plate arranged in the air outlet chamber and at least partially spaced apart from the partition plate, an outer periphery of the limit plate being coupled to the inner peripheral wall of the barrel, and the limit plate having a connection hole and a guide hole, the limit plate having a closed, continuous annular recess from a lower side to an upper side of the limit plate, wherein the annular recess surrounds the guide hole.

2. The liquid reservoir according to claim 1, wherein:
the barrel has a plurality of annular protrusions formed on an inner wall of the barrel,
an upper surface of the partition plate is restricted by the plurality of annular protrusions, and
the limit plate is positioned by the plurality of annular protrusions or by the plurality of annular protrusions and the partition plate.

3. The liquid reservoir according to claim 2, wherein:
a bent end is arranged on an outer peripheral edge of the limit plate and coupled to the inner peripheral wall of the barrel;
the plurality of annular protrusions comprise a first annular protrusion and a second annular protrusion; and
the upper surface of the partition plate is restricted by the first annular protrusion, a terminal tip of the bent end abuts against the partition plate, and a lower surface of the limit plate is restricted by the second annular protrusion.

4. The liquid reservoir according to claim 2, wherein:
a bent end is arranged on an outer peripheral edge of the limit plate and fits against the inner peripheral wall of the barrel;
the plurality of annular protrusions comprise a first annular protrusion, a second annular protrusion, and a third annular protrusion between the first annular protrusion and the second annular protrusion; and
the upper surface of the partition plate is restricted by the first annular protrusion, a terminal tip of the bent end is restricted by the second annular protrusion, and an upper surface of the limit plate is restricted by the third annular protrusion.

5. The liquid reservoir according to claim 2, further comprising:
a filter screen holder arranged within the air inlet chamber and fixed between the plurality of annular protrusions; and
a filter screen mounted on the filter screen holder.

6. The liquid reservoir according to claim 1, wherein the valve further comprises a valve core assembly, and the valve core assembly comprises:
a guide block having a part movably arranged between the partition plate and the limit plate and having an end movably fit in the guide hole;
a spring arranged between the partition plate and the guide block and configured to push the guide block toward the limit plate; and
a valve plate mounted on the guide block and configured to selectively close and open the valve hole.

7. A compressor, comprising a housing, a motor, a compression mechanism disposed inside the housing, and a liquid reservoir according to claim 1, the liquid reservoir being arranged outside the housing and coupled to the compression mechanism by the air outlet tube.

* * * * *